United States Patent [19]

Byrne

[11] Patent Number: 5,087,207
[45] Date of Patent: Feb. 11, 1992

[54] CIRCUIT-SELECTING ADAPTER FOR AN ELECTRICAL POWER RECEPTACLE

[76] Inventor: Norman R. Byrne, 2736 Honey Creek, NE., Ada, Mich. 49301

[21] Appl. No.: 625,980

[22] Filed: Dec. 11, 1990

[51] Int. Cl.⁵ .................................................. H01R 25/16
[52] U.S. Cl. .................................... 439/215; 439/218
[58] Field of Search .............................. 439/207-216, 439/217-221, 222, 170-173, 652, 105; 174/48, 49

[56] References Cited

U.S. PATENT DOCUMENTS

| | | | |
|---|---|---|---|
| 4,085,996 | 4/1978 | Koslo | 439/105 |
| 4,775,328 | 10/1988 | McCarthy | 439/211 |
| 4,814,941 | 3/1989 | Speet et al. | 174/49 |
| 4,952,164 | 8/1990 | French et al. | 439/652 |
| 4,985,806 | 1/1991 | Mazzollo et al. | 439/131 |

OTHER PUBLICATIONS

"Electri-Pak 7 ™" brochure by Electri-Cable Assemblies, Inc., Shelton, Conn.

*Primary Examiner*—Neil Abrams
*Attorney, Agent, or Firm*—Varnum, Riddering, Schmidt & Howlett

[57] ABSTRACT

A pair of adapter blocks, each arrangeable in two physical orientations, provide an interface between an electrical outlet receptacle block and four different electrical circuits of a power distribution block. Each adapter block has terminals on one end for engaging the receptacle block, including one terminal disposed on the centerline of the adapter and a pair of terminals disposed on opposite sides of and equidistant from the centerline. Furthermore, each adapter has terminals on an opposite end for engagement with the power distribution block including terminals disposed on opposite sides of the centerline and offset from the centerline by different distances. Each receptacle block may be changed from one physical orientation to another by rotation about the centerline. One of the blocks, in a first physical orientation, connects a first positive terminal, a first neutral terminal, and a ground terminal of the power distribution block to the outlet receptacle block and in a second orientation connects a second of the positive terminals, a second of the neutral terminals and a ground terminal of the power distribution block to the power receptacle block. Similarly, the second adapter block in a first physical orientation connects a third positive terminal, a third neutral terminal, and a ground terminal of the power distribution block to the outlet receptacle and in a second physical orientation connects a fourth positive terminal, a fourth neutral terminal and a ground terminal of the power distribution block to the outlet receptacle block.

12 Claims, 2 Drawing Sheets

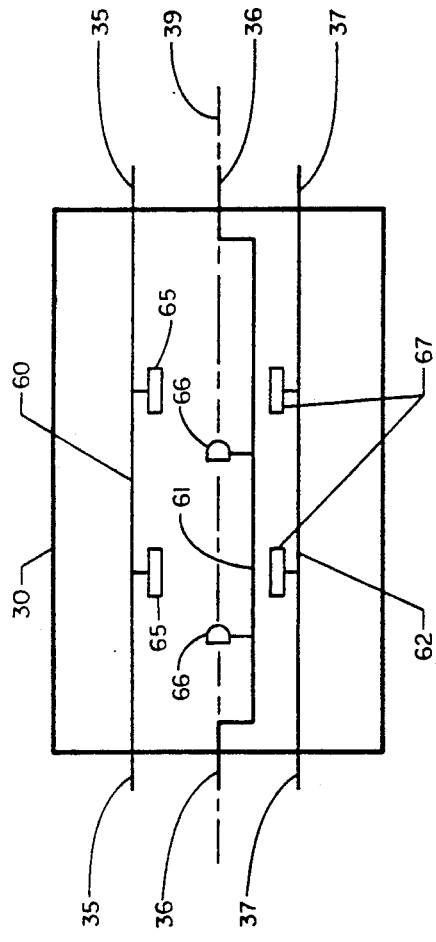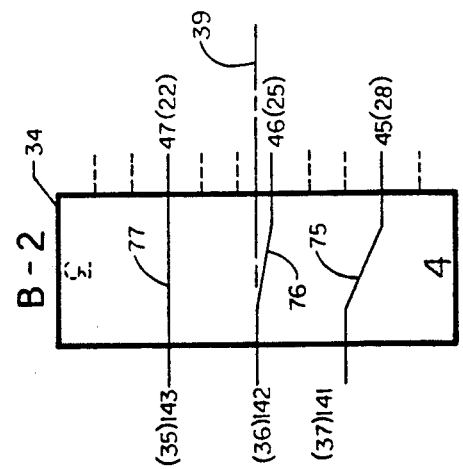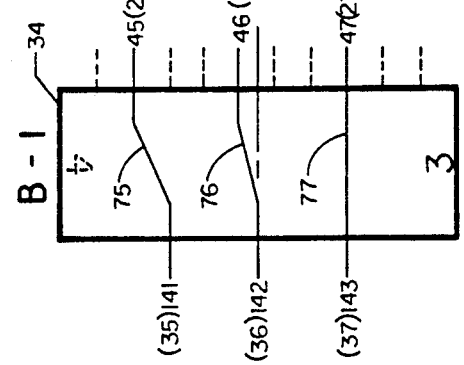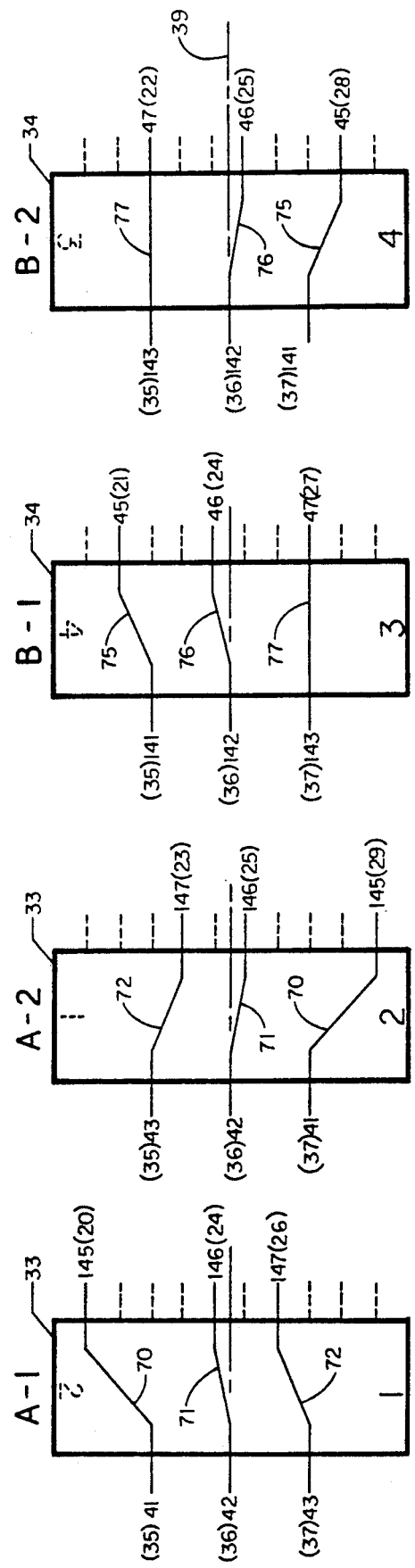

CIRCUIT-SELECTING ADAPTER FOR AN ELECTRICAL POWER RECEPTACLE

FIELD OF THE INVENTION

The present invention relates to electrical power receptacles and more particularly to an arrangement for connecting a power receptacle to a selected one of a plurality of a power supply circuits.

BACKGROUND ART

In the modern office environment or other work locations, the need for electrical power is ever increasing. Furthermore, several separate electrical circuits may be required in one area to accommodate various types of equipment such as computers, communication equipment, and other electrical equipment. Providing electrical power receptacles in the vicinities of various pieces of equipment requiring separate electrical circuitry, in a flexible and convenient manner, is a significant problem in the art.

Some systems incorporate switches in electrical outlet receptacle blocks to connect the outlet to different circuits. Others use adapters between the outlet and the plug of the electric cord. One particular arrangement is disclosed in U.S. Pat. No. 4,775,328 to D. G. McCarthy, issued Oct. 4, 1988. The patent discloses an electrical power block assembly for installation in a raceway of a wall panel of a type commonly used in modular wall systems for constructing office and other work areas. The prior arrangement includes a power block having seven wires, representing three separate circuits, and several ports for receiving electrical outlet receptacle adapters or modules. Different modules are used to connect a power cord or the like to the different circuits of the power block. Each of the ports of the power block has seven terminals, corresponding to the seven wires, and each of several outlet receptacle modules has a uniquely positioned set of three terminals for engaging a predetermined set of three of the seven power block terminals. In this manner, different outlet receptacle modules provide electrical connection to different ones of the three separate circuits. A disadvantage of this prior art arrangement is that a separate supply of receptacle modules must be kept and a receptacle module of the proper type must be found each time a change is to be made to a different circuit arrangement. This presents a substantial inconvenience to the user and requires a separate stocking of these parts.

SUMMARY OF THE INVENTION

In accordance with the invention, these and other problems are the prior art are overcome by means of an interface adapter which provides an interface between an outlet receptacle block and a plurality of different electrical circuits. The adapter block has first and second physical orientations and terminals on one end for engaging terminals of the outlet receptacle block. It has terminals on an opposite end for engaging one set of terminals of the power distribution block in one physical orientation and for engaging another set of terminals of the power distribution block in another physical orientation. In accordance with one aspect of the invention, the adapter block has a horizontal centerline and terminals for engaging the outlet receptacle block are disposed on opposite sides of and equidistant from the centerline. Terminals for engaging the power distribution block are disposed on opposite sides of the centerline and offset from the centerline by different distances. Advantageously, the adapter block may be changed from one physical orientation to the other physical orientation by rotation about the centerline in such a manner that a pair of terminals on the one end always engage the same pair of terminals of the outlet receptacle block and a pair of terminals on the opposite end engage different pairs of terminals of the power distribution block, thereby providing connection to different circuits in different physical orientations.

In one particular embodiment of the invention, the power distribution block has four positive terminals, two ground terminals and four neutral terminals and the outlet receptacle block has a positive terminal, ground terminal, and a neutral terminal. A first adapter block has three terminals on one end for engagement with the outlet receptacle block, one of which is in alignment with the centerline of the adapter and the other two are offset equal distance from the centerline. The first adapter block has three terminals on the opposite end for engagement with terminals of the power distribution block. Two of the last named terminals of the first adapter are disposed on one side of the centerline and one is disposed on the other side of the centerline. The power distribution block has a centerline coinciding with that of the adapter block and terminals of the power distribution block are arranged such that four positive terminals are disposed on one side of the centerline, four neutral terminals are disposed on the opposite side of its centerline and at least one ground terminal is disposed on each side of the centerline. The first adapter block in one physical orientation provides connection from a first of the positive terminals, a first of the neutral terminals, and one of the ground terminals in a first orientation, and from a second of the positive terminals, a second of the neutral terminals, and one of the ground terminals in a second orientation. A second adapter block is constructed in a manner analogous to the first adapter block but has terminals at the end for engagement to the power distribution block arranged at different positions from the terminals of the first adapter block. The terminals of the second adapter block are arranged specifically to provide connection from a third positive terminal, a third neutral terminal, and one of the ground terminals in a first physical orientation of the second adapter block and to provide connection to a fourth positive, a fourth neutral, and one ground terminal in a second physical orientation. Advantageously, the two separate adapter blocks provide connection between an outlet receptacle block and four separate circuits of the power distribution block.

In one specific embodiment, the outlet receptacle block has terminals at opposite ends for engagement with oppositely directed connectors of a power distribution block through the adapters. Advantageously, the adapters may be interchangeably retained on the two ends of the outlet receptacle block and positioned appropriately to provide connection to any one of four electrical circuits of the power distribution block.

Connections internal to the adapter blocks may be made by means of electrical conductor bars incorporating the terminal ends on opposite ends of the adapter blocks. Advantageously, each adapter block is simple to manufacture and requires only three separate conductor bars to form the terminals and connections of the adapter blocks.

BRIEF DESCRIPTION OF THE DRAWING

An illustrative embodiment of the invention is described below with reference to the drawing in which:

FIG. 2 is a schematic representation of electrical connections internal to the electrical outlet receptacle block of FIG. 1;

FIG. 3 is a diagrammatic representation of adapter block A of FIG. 1 in a first physical orientation;

FIG. 4 is a schematic representation of adapter block A of FIG. 1 in a second physical orientation; and FIG. 5 is a diagrammatic representation of adapter block B of FIG. 1 in a first physical orientation;

FIG. 6 is a diagrammatic representation of adapter block B of FIG. 1 in a second physical orientation.

DETAILED DESCRIPTION

Figure 1:
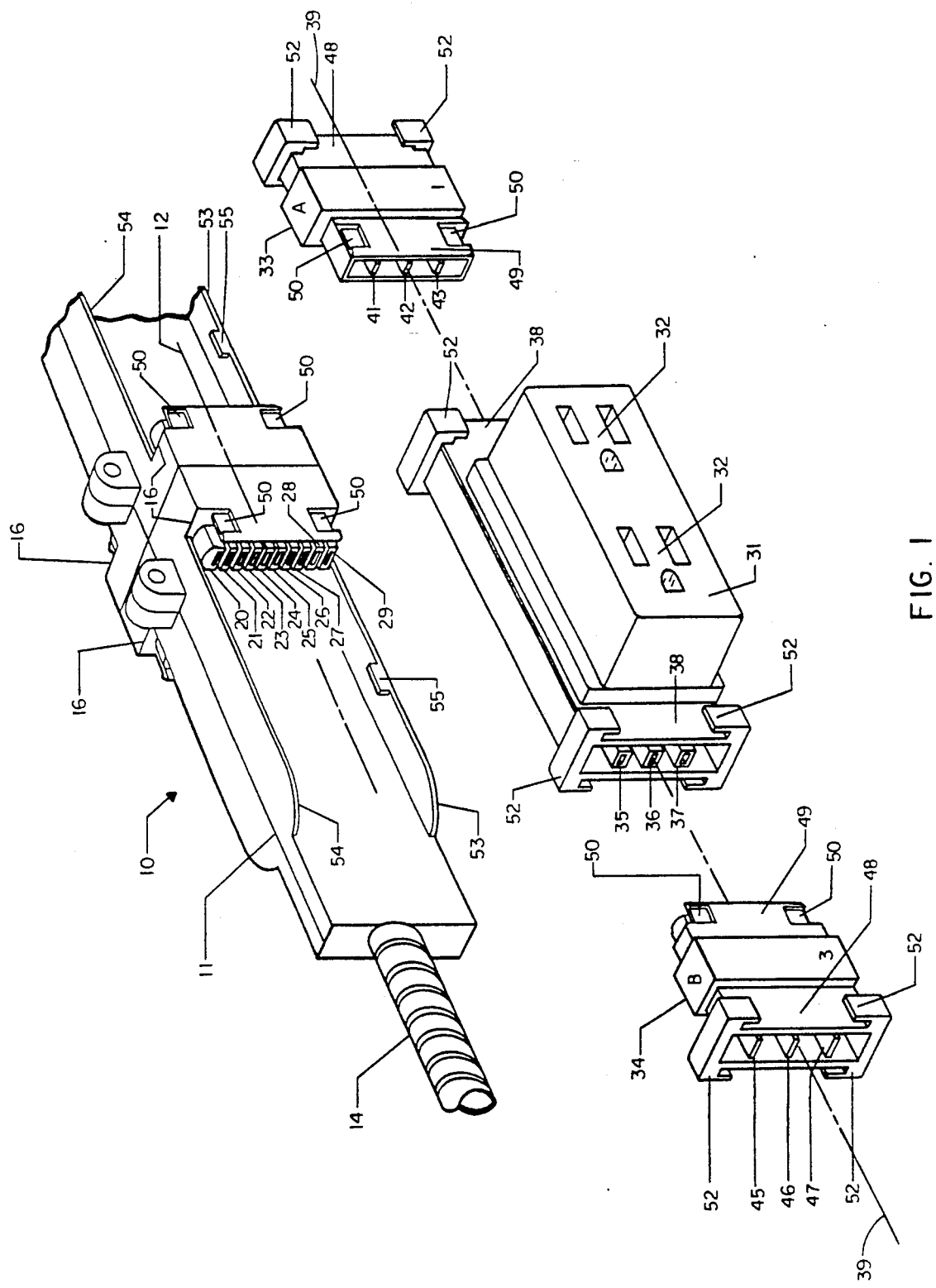
FIG. 1 is a perspective view of an electrical junction block together with an outlet receptacle block and adapter blocks in accordance with the invention.

FIG. 1 depicts an electrical junction block, shown generally at 10, used for delivering electrical power, for example, in a raceway of a modular wall panel. The junction block assembly 10 comprises a housing 11 having attached thereto a conduit 14 containing a plurality of electrical conductors representing several different electrical circuits. The housing 11 has a symmetrical structure with two opposing connectors 16 on each side, allowing four separate outlet receptacle blocks 30 to be connected to the junction block. An A-adapter block 33 or a B-adapter block 34 is inserted between the outlet receptacle block 30 and one of the connectors 16 to provide connection to selected ones of the terminals of the connector 16. Each of the connectors 16 has ten output terminals, 20-29, in a vertically extending columnar arrangement, and correspondingly positioned ones of the terminals of each of the four connectors 16 are electrically connected to one of ten conductors received in the housing 11 via conduit 14. Various combinations of the ten conductors, and hence the ten terminals of each of the connectors 16, define different electrical circuits in this illustrative embodiment. The ten terminals are divided into a set of four neutral terminals, 20-23, a set of four positive terminals, 26-29, and a set of two ground terminals, 24 and 25. The ten terminals of each of the connectors 16 are arranged symmetrically about a horizontally extending centerline 12 such that the four positive output terminals are on one side of the centerline and the four neutral output terminals are on the other side of the centerline and one of each of the two ground terminals is positioned on either side of the centerline. Each adapter block such as the A-block 33, is provided with three terminals at one end for engaging a first one of the positive terminals (e.g., 26) disposed a certain distance below the centerline and a first one of the neutral terminals (e.g., 20) disposed a different distance above the centerline as well as one of the two ground terminals disposed (e.g., 24) equidistant from the centerline. A rotation of the adapter block from a first physical orientation about the centerline to a second physical orientation causes the adapter to be connected to a second one of the positive terminals (e.g., 29), a second one of the neutral terminals (e.g., 23) and a second one of the ground terminals. By proper positioning of the terminals of the adapter blocks, a different adapter block, e.g., the B-block 34 may be inserted between the connector 16 and the outlet receptacle block 30, and make connection to a third one of the positive terminals, a third one of the neutral terminals, and one of the ground terminals in one physical orientation, and connection to a fourth one of the positive terminals, a fourth one of the neutral terminals, and the other of the ground terminals in a second physical orientation attained by rotation about the centerline from the first physical orientation. Accordingly, the two adapter blocks A and B, having different terminal configurations, each provides connection to two different sets of terminals and hence different electrical circuits, thereby allowing access to four different electrical circuits from a single electrical outlet block to a power distribution block such as the junction block assembly 10. The receptacle block 30, shown in FIG. 1, is provided with terminals at opposite ends allowing the receptacle outlet block to be used with any of the four connectors 16 of the junction block housing 11 via the A and B adapter blocks. Since the receptacle block 30 is provided with terminals and connectors at both ends, both the adapter blocks A and B may be retained on the ends of the outlet receptacle block, with one of them in actual use while the other is available for use for connection to different ones of the circuits of junction block 10. The connectors 16 on the junction block housing 11 are provided with flanges 50 for engagement with latches 52 on connectors 48 at one end of each of the adapter blocks 33 and 34. Connectors 49 at the opposite ends of the adapter blocks are provided with flanges 50 for engagement with latches 52 of connectors 38 of the outlet receptacle block 30. The junction block housing 11 is provided with top and bottom support flanges 53 and 54 for retaining the outlet receptacle block 30 and adapter blocks 33 and 34. A tab 55 may engage with a linearally extending recess (not shown in the drawing) of receptacle block 30 or similar arrangement. One such arrangement is shown in my co-pending application entitled "Electrical and Connection Assembly" Ser. No. 07/570,879 filed Aug. 22, 1990.

Connectors 49 of adapter blocks 33 and 34 are each provided with three male terminals 41-43 shown on the A-block 33 in FIG. 1. An identical set of terminals is provided on connector 49 of the B-block 34. Terminals 41-43 are adapted to engage female input terminals 35-37 of connectors 38 at both ends of the outlet receptacle block 30. A centerline 39 extends through the center of the A-block 33, the receptacle block 30 and the B-block 34. The terminals 42 of the A-block and the B-block are positioned such that their horizontal centerline coincides with centerline 39. Similarly, the terminals 36 at opposite ends of the receptacle block 30 have a horizontal centerline coincident with centerline 39. Terminals 41 and 43 of the A-block and B-block connectors 49 are positioned equidistant from the centerline 39, as are terminals 35 and 37 of receptacle block 30 with which terminals 41 and 43 engage. The arrangement of terminals on receptacle block 30 is shown further in FIG. 2. FIG. 2 is a diagrammatic representation of outlet receptacle 30 showing a neutral conductor 60 connecting input terminals 35 to a pair of neutral receptacle output terminals 66, a ground conductor 61 connecting input terminals 36 to a pair of ground receptacle output terminals 66 and a positive conductor 62 connecting input terminals 37 to positive receptacle output terminals 67. The terminals 35-37 and 41-43 are disposed with respect to the centerline such that in one physical orientation of the A-block and B-block terminals 41 and 43 engage terminals 35 and 37, respectively, and in another physical orientation, in which the adapter blocks are rotated about the horizontal centerline 39, the terminals 41 and 43 engage terminals 37 and 35, respectively.

In contrast to the symmetrical configuration of the terminals of connectors 38 and 49, the terminals of connectors 48, at the opposite ends of the A and B adapter blocks are offset from the centerline 39. As will be explained further later with respect to FIGS. 3–6, the centerline 12 of connector 16 coincides With the centerline 39. As described earlier, the connector 16 has a pair of ground terminals spaced equal distance from the centerline 12. Accordingly, the terminal 46, which is the ground terminal, is offset from the centerline 12 to engage one of the ground terminals (e.g., 24) in one physical orientation of the adapter block and another (e.g., 25) in the other orientation. Similarly, the terminal 45, in one orientation will engage a first one of the neutral terminals (e.g., 21) offset a predetermined distance from the centerline, and terminal 47 will engage one of the positive terminals (e.g., 27) offset a different predetermined distance from the centerline. It will be apparent, that, since terminals 45 and 47 are offset from the centerline by different distances, in a different rotational orientation of the adapter block (e.g., B-block 34) the terminal 45 will engage a different one of the positive terminals (e.g., 28) and terminal 47 will engage a different one of the neutral terminals (e.g., 22).

FIGS. 3–6 are diagrammatic representations of the A-block and B-block, each in two different physical orientations, rotated about centerline 39 and each configuration representing a connection to a different one of four separate circuits represented by the ten terminals of the connector 16 of junction block housing 11. The configurations of FIGS. 3–6 have been labeled 1–4, respectively showing connections for the four different circuits. The numbers in parenthesis refer to terminals of connectors 16 and 38. FIG. 3 represents the A-block in its first physical configuration and terminals 41–43, also shown in FIG. 1, will be connected to terminals 35–37 of the outlet receptacle block 30. Conductors 70–72 connect terminals 41–43, respectively, to terminals 145–147, respectively. Terminals 145–147 are not shown in FIG. 1 but correspond directly to terminals 45–47 of the B-block 34 shown in FIG. 1. Conductors 70–72 may each comprise a metallic conducting bar shaped in the appropriate configuration to make the interconnection and having terminal ends (e.g., 41, 145) formed integral with the conducting bar. Using such conducting bars, the adapter blocks 33 and 34 can readily be manufactured in a cost-effective manner.

Terminal 145 of FIG. 3 engages one of the neutral terminals 20 when made the A-block is mated with connector 16 in its first physical orientation. Concomitantly, terminal 146 engages ground terminal 24 and terminal 147 engages positive terminal 26. In the second physical orientation of the A-block, designated as A-2 in FIG. 4, the A-block is rotated about the centerline 39. In the second physical orientation, the terminal 147 engages neutral terminal 23, which is positioned at the same distance from the centerline 39 as terminal 26 engaged by terminal 147 in the first physical configuration. Accordingly, neutral terminal 23 is connected via conductor 72 to terminal 43 which now engages the neutral terminal 35 of outlet receptacle block 30. As is apparent from the drawing, the terminal 145 which in the previous orientation was connected to neutral terminal 20 is now connected to positive terminal 29, and via conductor 70 and terminal 41, interconnects positive terminal 37 of receptacle outlet block 30 with terminal 29. In a similar fashion, terminal 146 is now connected to ground terminal 25 and a connection is established from ground terminal 25 to ground terminal 36 of receptacle block 30.

FIG. 5 is a representation of the B-block 34 in the first physical orientation. Terminals 141–143, not shown in FIG. 1, correspond directly to terminals 41–43 of the A-block 33, and are arranged for engagement with terminals 35–37 of receptacle block 30. Terminals 45–47 correspond to terminals 45–47 shown in FIG. 1. In the physical orientation shown in FIG. 5, the B-block in its first orientation connects neutral terminal 21 to neutral terminal 35 of the outlet receptacle block 30 via terminal 45, conductor 75, and terminal 141. Similarly, a ground terminal 24 is connected to ground terminal 36 by means of terminal 46, conductor 76, and terminal 142, and positive terminal 27 is connected positive input terminal 37 via terminal 47, conductor 77, and terminal 143. In the second physical orientation of the B-block, shown in FIG. 6, a fourth circuit connection is represented. In this configuration, neutral terminal 22 is connected to neutral input terminal 35 via terminals 47 and 143 and conductor 77. Similarly, ground terminal 25 is connected to input terminal 36 via terminals 46 and 142, and conductor 76, and positive terminal 28 is connected to input terminal 37 via terminals 45 and 141, and conductor 75.

It will be understood that the above-described embodiment is only illustrative of the principles of the invention and numerous other configurations may be devised by those skilled in the art without departing from the spirit and scope of the invention.

What is claimed is:

1. An adaptable power outlet receptacle arrangement for connection to a power distribution block having a plurality of electrical conductors representing a plurality of different electrical circuits, including at least two positive conductors connected to two positive output terminals and two neutral conductors connected to two neutral output terminals, said arrangement comprising:

an outlet receptacle block having at least a positive and a neutral input terminal; and an adapter block adjustable to a first and a second physical orientation, said adapter block having opposite ends and comprising first and second terminals on one of said ends for engaging said input terminals of said outlet receptacle block and first and second terminals at an opposite end opposite said one end for engaging one of said positive output terminals and one of said neutral output terminals in said first physical orientation of said adapter block and another of said positive output terminals and another of said neutral output terminals in said second physical orientation of said adapter block;

said adapter block comprising a horizontal centerline and said first and second terminals for engaging said positive output terminal and neutral output terminal disposed on opposite sides of said centerline and offset from said centerline by different distances.

2. The arrangement in accordance with claim 1 wherein said adapter block comprises a first conductor for interconnecting said first of said terminals for engaging said input terminals of said outlet receptacle block and said first of said terminals for engaging said positive and neutral output terminals, and a second conductor for interconnecting said second of said terminals for engaging and said input terminals of said outlet receptacle block and said second of said terminals for engaging and said positive and neutral output terminals.

3. The arrangement in accordance with claim 2 wherein each of said conductors of said adapter block comprises a metallic conductor bar having terminal ends, corresponding to terminals of said adapter block, formed integral therewith.

4. The arrangement in accordance with claim 1 wherein said outlet receptacle block has a ground terminal and said power distribution block has at least two ground terminals, and wherein said adapter block has first and second ground terminals for engagement with said ground terminal of said outlet receptacle block and said ground terminals of said power distribution block, respectively, and an electrical conductor interconnecting said first and said second ground terminals.

5. The arrangement in accordance with claim 4 wherein said terminals of said power distribution block are arranged in a columnar arrangement having a centerline and different ones of said at least two ground terminals are disposed on opposite sides of said centerline.

6. The arrangement in accordance with claim 5 wherein said adapter has a centerline substantially coincident with said centerline of said columnar arrangement and wherein said first ground terminal is in alignment with said centerline of said adapter and said second ground terminal is offset from said centerline of said adapter.

7. The arrangement in accordance with claim 4 wherein said conductor for interconnecting said first and second ground terminals comprises a ground conductor bar having terminal ends formed integral therewith and corresponding to said first and second ground terminals.

8. An adaptable power outlet receptacle arrangement comprising:
a power distribution block having a plurality of electrical conductors representing different electrical circuits and comprising a columnar connector having a centerline and having at least four positive output terminals and at least one ground output terminal disposed on one side of said centerline and having at least four neutral output terminals and at least one ground output terminal disposed on an opposite side of said centerline;
an outer receptacle block having at least a positive input terminal, a ground input terminal, and a neutral input terminal;
a first adapter block having opposite ends and at least three terminals on one end for engagement with said terminals of said outlet receptacle block and at least three terminals on an opposite end opposite said one end, said first adapter block having at least first and second physical orientations for engagement with said power distribution block, said terminals on said opposite end disposed for engagement with a first one of said positive output terminals, one of said ground output terminals, and a first one of said neutral output terminals of said power distribution block when said first adapter block is in said first physical orientation and disposed for engagement with a second one of said positive output terminals, one of said ground output terminals, and a second one of said neutral output terminals, when said first adapter block is in said second physical orientation; and
a second adapter block having opposite ends, and at least three terminals on one end for engagement with said terminals of said outlet receptacle block and at least three terminals on an opposite end opposite said one end of said second adapter block, said second adapter block having first and second physical orientations for engagement with said power distribution block, said terminals on said opposite end disposed for engagement with a third one of said positive output terminals, one of said ground output terminals and a third one of said neutral output terminals of said power receptacle block when said second adapter block is in said first physical orientation and disposed for engagement with a fourth one of said positive output terminals, one of said ground output terminals, and a fourth one of said neutral output terminals when said second adapter block is in said second physical orientation.

9. The arrangement in accordance with claim 8 wherein said first and said second adapter blocks each comprises a centerline and said one end of each of said blocks each comprises one terminal in alignment with said centerline and one terminal on each side of said centerline and disposed equidistant from said centerline.

10. The arrangement in accordance with claim 8 wherein said adapter blocks comprise conductor bars interconnecting terminals on said opposite ends and having terminal ends formed integral therewith.

11. The arrangement in accordance with claim 8 wherein said outlet receptacle block has opposite ends, said terminals of said outlet receptacle block being disposed on one of said ends of said receptacle block for engagement with one of said adapter blocks engaging said power distribution block and said receptacle block comprising a retainer for retaining another of said adapter blocks on another end of said outlet receptacle block, whereby both of said adapter blocks are conveniently available and said outlet receptacle block may be connected to any one of four different electrical circuits by use of the two adapter blocks in different physical orientations.

12. The arrangement in accordance with claim 11, wherein said power distribution block comprises oppositely directed connectors and said retainer comprises a connector having terminals disposed for engagement with said adapter blocks, whereby said receptacle block may be connected to said power distribution block with one of said adapters block at either end of said receptacle block.

* * * * *